US012564854B2

(12) United States Patent
De Bondt et al.

(10) Patent No.: US 12,564,854 B2
(45) Date of Patent: Mar. 3, 2026

(54) DEVICE FOR PAINTING A COMPRESSOR OR VACUUM PUMP HOUSING AND METHOD APPLIED

(71) Applicant: ATLAS COPCO AIRPOWER, NAAMLOZE VENNOOTSCHAP, Wilrijk (BE)

(72) Inventors: Robin De Bondt, Wilrijk (BE); Karel Vennens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 659 days.

(21) Appl. No.: 17/615,181

(22) PCT Filed: May 11, 2020

(86) PCT No.: PCT/IB2020/054428

§ 371 (c)(1),
(2) Date: Nov. 30, 2021

(87) PCT Pub. No.: WO2020/250053

PCT Pub. Date: Dec. 17, 2020

(65) Prior Publication Data

US 2022/0226853 A1 Jul. 21, 2022

Related U.S. Application Data

(60) Provisional application No. 62/859,321, filed on Jun. 10, 2019.

(30) Foreign Application Priority Data

Sep. 16, 2019 (BE) .................................. 2019/5613

(51) Int. Cl.
*B05B 13/04* (2006.01)
*B05B 13/06* (2006.01)
(Continued)

(52) U.S. Cl.
CPC ...... *B05B 13/0431* (2013.01); *B05B 13/0636* (2013.01); *B05B 15/25* (2018.02);
(Continued)

(58) Field of Classification Search
USPC ....... 118/306, 317, 663, 679–682, 323, 321; 239/227
See application file for complete search history.

(56) References Cited

U.S. PATENT DOCUMENTS 3,081,947 A * 3/1963 Taylor ................ B05B 13/0636 239/128
3,702,107 A * 11/1972 Rood ................. B05B 13/0618 118/317
4,379,731 A 4/1983 Long et al.
4,747,541 A * 5/1988 Morine .................... A21B 3/16 118/313
(Continued)

FOREIGN PATENT DOCUMENTS

WO 9530812 A1 11/1995

OTHER PUBLICATIONS https://en.wikipedia.org/wiki/Rotation (Year: 2014).*
International Search Report and Written Opinion in corresponding PCT Application No. PCT/IB2020/054428, dated Jul. 1, 2020.

*Primary Examiner* — Yewebdar T Tadesse
(74) *Attorney, Agent, or Firm* — BACON & THOMAS, PLLC

(57) ABSTRACT

A device for painting a compressor or vacuum pump housing including a first semi-cylindrical structure adjoined to a second semi-cylindrical structure, a dispersing head including a rotating part having a bell shaped structure and a stationary part; a paint reservoir connected to the stationary part through a conduit; a supporting structure including fixing means. The device further includes a controller for controlling a rotational speed of the rotating part. The
(Continued)

controller is provided with means for controlling a rotational direction of the rotating part in a clockwise direction for painting the first semi-cylindrical structure of the compressor or vacuum pump housing and for changing the rotational direction to a counterclockwise direction for painting the second semi-cylindrical structure of the compressor or vacuum pump housing.

14 Claims, 2 Drawing Sheets

(51) Int. Cl.

| | |
|---|---|
| ***B05B 15/25*** | (2018.01) |
| *B05B 3/10* | (2006.01) |
| *B05B 15/58* | (2018.01) |
| *F04C 18/08* | (2006.01) |

(52) U.S. Cl.

CPC ............. *B05B 3/1014* (2013.01); *B05B 15/58* (2018.02); *F04C 18/086* (2013.01); *F04C 2230/91* (2013.01); *F04C 2240/30* (2013.01)

(56) References Cited

U.S. PATENT DOCUMENTS

| | | | | |
|---|---|---|---|---|
| 7,591,901 | B1 * | 9/2009 | Weisenberg | F16L 55/1645 118/317 |
| 2007/0181061 | A1 * | 8/2007 | Whittle | B05B 7/0408 118/317 |
| 2010/0193602 | A1 | 8/2010 | Ballu et al. | |
| 2011/0244125 | A1 * | 10/2011 | Weisenberg | C08G 18/5021 427/236 |
| 2013/0206864 | A1 * | 8/2013 | Kearns | B05B 15/25 239/135 |
| 2014/0251206 | A1 * | 9/2014 | Kim | B05B 13/005 118/306 |
| 2014/0314952 | A1 * | 10/2014 | Chism | B05B 9/007 427/236 |
| 2016/0067731 | A1 * | 3/2016 | Schenke | B05B 9/0409 118/69 |
| 2016/0333892 | A1 * | 11/2016 | Hashimoto | F01D 9/041 |
| 2018/0029061 | A1 * | 2/2018 | Hayama | B05C 5/0216 |

* cited by examiner

DEVICE FOR PAINTING A COMPRESSOR OR VACUUM PUMP HOUSING AND METHOD APPLIED

This invention relates to a device for painting a compressor or vacuum pump housing comprising a first semi-cylindrical structure adjoined to a second semi-cylindrical structure, the device comprising:

- a dispersing head for dispersing paint droplets, the dispersing head comprising a rotating part having a bell shaped structure and a stationary part;
- a paint reservoir connected to the stationary part through a conduit;
- a supporting structure comprising fixing means adapted to receive the compressor or vacuum pump housing in a fixed manner.

BACKGROUND OF THE INVENTION

Known devices used for painting different surfaces comprise a dispersing head for dispersing the paint, the dispersing head comprising a rotating bell shaped structure for directing the paint away from the dispersing head and onto the surface needing to be painted.

The rotating bell being rotated around its axis at a certain speed, as can be found for example in US 2010/193,602.

The device and method described therein being designed for coating surfaces like motor vehicle bodies. Such a device being however not suitable for painting the inside surface of a housing of a screw, a roots or a tooth compressor or vacuum pump, such housings comprising two interconnected lobes or semi-cylindrical structures.

Tests have shown that, due to the curvatures of the inside surface of such compressor or vacuum pump housings, if such a device would be used for painting such a surface, a thicker layer of paint would be formed on certain sections thereof.

Indeed, due to the trajectory of the paint droplets and due to the inflection surface found on the height of the inside surface of such compressor or vacuum pump housings, a thicker layer of paint would be formed onto the inside surface immediately after or immediately following the adjoining section of the two lobes or immediately following the inflection surface such lobes are creating.

Such a situation is highly unwanted since the thickness of the layer of paint covering the inside surface of the housing is desired to be uniform and of a certain predetermined thickness. Typically, the space between the rotors and the housing being very small and not allowing for such a thicker region.

Another unwanted effect is that, such errors in the thickness of the layer of paint can lead to damages to the paint covering the rotors, which are mounted within the housing, or even to the rotors during functioning.

Indeed, because of the potential direct contact during functioning between the rotors and this surface of the housing immediately after the adjoining section of the two lobes or immediately following the inflection surface the lobes are creating, the paint covering the rotors as well as the paint covering the inside surface of the housing, or even the edge of the rotors can be damaged. This translates into a higher risk of leakages along these surfaces and an even bigger risk for these surfaces to develop rust.

Furthermore, because such a thicker layer of paint is formed, errors in mounting the rotors within the housing can be encountered, because of the resulting displacement in an axial direction. Such errors being highly unwanted since they affect the entire functioning of the compressor or vacuum pump, potentially creating bigger forces acting onto the bearings supporting the rotors, which can lead to a reduction in efficiency and lifetime of the components part of the compressor or vacuum pump.

Furthermore, an over painting of the inside surface of the compressor or vacuum pump housing means considerable material losses and considerably longer times needed for drying, which translates into extra manufacturing costs and delays on the production line.

SUMMARY OF THE INVENTION

Taking the above drawbacks into account it is an object of the present invention to provide a device for painting a compressor or vacuum pump housing achieving a uniform layer of paint onto the inside surface of the housing.

Another object of the present invention is to eliminate the risk of overpainting the inside surface and eliminate the risk of mounting errors when rotors are being mounted within the painted housing.

Another object of the present invention is to provide a method for painting a compressor or vacuum pump housing that would be time and cost efficient.

The present invention solves at least one of the above and/or other problems by providing a device for painting a compressor or vacuum pump housing comprising a first semi-cylindrical structure adjoined to a second semi-cylindrical structure, the device comprising:

- a dispersing head for dispersing paint droplets, the dispersing head comprising a rotating part having a bell shaped structure and a stationary part;
- a paint reservoir connected to the stationary part through a conduit;
- a supporting structure comprising fixing means adapted to receive the compressor or vacuum pump housing in a fixed manner;

wherein the device further comprises a controller for controlling a rotational speed of the rotating part, whereby the controller is provided with means for controlling a rotational direction of the rotating part in a clockwise direction for painting the first semi-cylindrical structure of the housing and for changing the rotational direction to a counterclockwise direction for painting the second semi-cylindrical structure of the housing.

Because the controller is provided with means for controlling the rotational direction of the rotating part in a clockwise direction for painting the first semi-cylindrical structure of the housing and for changing the rotational direction to a counterclockwise direction for painting the second semi-cylindrical structure of the housing, a uniform layer of paint is achieved throughout the inside surface of the compressor or vacuum pump housing. Accordingly, the phenomenon of over painting is not encountered at the level of the inflection surface where the two semi-cylindrical structures are adjoined.

Indeed, because the controller is provided with such means, the direction given to the paint droplets leaving the bell shaped structure and reaching the inside surface of the compressor or vacuum pump housing will be different when the first semi-cylindrical structure is painted than when the second semi-cylindrical structure is painted.

Because of this, the paint droplets leaving the bell shaped structure while painting the first semi-cylindrical structure will not reach the surface of the second semi-cylindrical structure, and paint droplets leaving the bell shaped structure while painting the second semi-cylindrical structure will not reach the surface of the first semi-cylindrical structure.

Consequently, not only the painting process is very easily controlled, but also the thickness of the paint layer is also very easily and accurately controlled over the entire inside surface of the compressor or vacuum pump housing.

Additionally, the overall manufacturing time of the compressor or vacuum pump housing is reduced, while a considerable reduction in material losses and much more reliable results are achieved.

Preferably, the compressor or vacuum pump housing is a screw, a roots or a tooth compressor or vacuum pump.

It should however not be excluded that a vane compressor or vacuum pump housing can also be painted with the device according to the present invention.

In an embodiment of the present invention, the device further comprises a mobile arm onto which the dispersing head is mounted.

Because of this, the process of painting the compressor or vacuum pump housing is fully automatized, decreasing the manufacturing time and increasing the accuracy of the achieved result.

In another embodiment according to the present invention, the controller is adapted to move the mobile arm on a vertical axis and a horizontal axis, enhancing the mobility and flexibility of the arm and allowing for the entire internal surface of the compressor or vacuum pump housing to be painted at high standards.

In a further embodiment according to the present invention, the controller is adapted to change the direction of rotation of the rotating part automatically.

By adopting such a feature, the entire process of painting the compressor or vacuum pump housing can be automatized, eliminating any potential human errors and making sure that an optimal result is achieved.

In yet another embodiment according to the present invention, the device further comprises a feeding system comprising regulating means adapted to regulate the volumetric flow rate of the paint reaching the dispersing head.

By regulating the volumetric flow rate of the paint reaching the dispersing head, the device is controlling to a very high accuracy the thickness of the resulting layer of paint covering the internal surface of the housing.

By volumetric flow rate it should be understood as the volume of fluid that is passing through a given cross sectional area per unit of time.

The present invention is further directed to a method for painting a compressor or vacuum pump housing comprising a first semi-cylindrical structure adjoined to a second semi-cylindrical structure, the method comprising the steps of:

- fixing the compressor or vacuum pump housing to a supporting structure of a painting device;
- connecting a paint reservoir to a stationary part of a dispersing head of the painting device through a conduit;

wherein the method further comprises the steps of:

- connecting the dispersing head provided with a rotating part and the stationary part to a controller, the controller controlling a rotational speed of the rotating part;
- controlling a rotational direction of the rotating part in clockwise direction and painting the first semi-cylindrical structure of the compressor or vacuum pump housing, and changing the rotational direction to a counterclockwise direction and painting the second semi-cylindrical structure of the compressor or vacuum pump housing.

It should be understood that the benefits presented with respect to the device for painting a compressor or vacuum pump housing also apply for the method.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
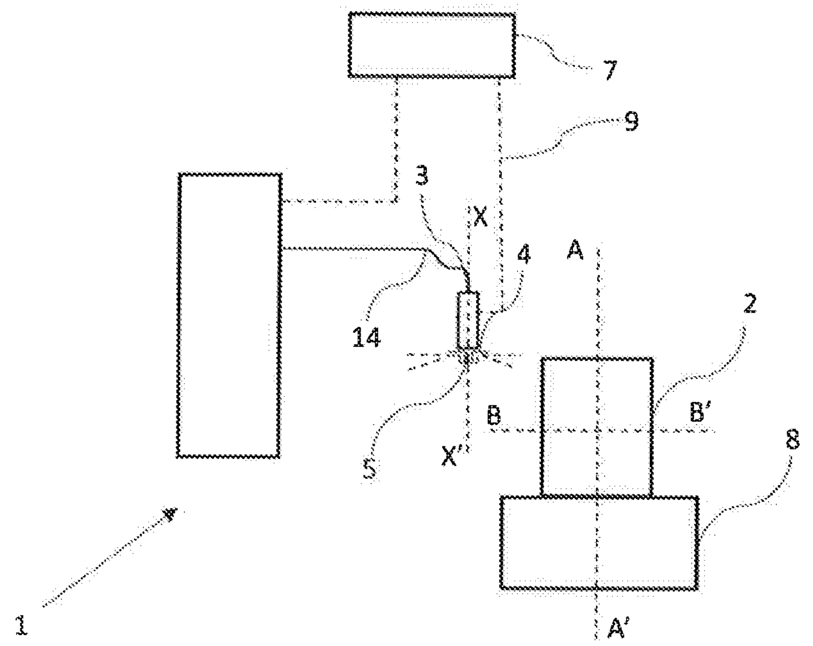
FIG. 1 and FIG. 2 schematically represent a device according to an embodiment of the present invention.

FIG. 1 illustrates a device 1 for painting a compressor or vacuum pump housing 2.

It should be understood that within the compressor or vacuum pump housing 2, the compression or vacuum process takes place by means of a rotor, and typically by means of two rotors.

The type of compressor or vacuum pump being of a kind selected from a group comprising: a roots, a vane, a tooth compressor or vacuum pump, etc.

It should be understood that said compressor or vacuum pump housing 2 has an internal surface and an external surface, whereby the internal surface is facing the rotors while such rotors are mounted within said compressor or vacuum pump housing 2, and the external surface is facing the exterior of the compression or vacuum chamber.

The device 1 comprising a dispersing head 3 generating and dispersing paint droplets, the dispersing head 3 comprising a rotating part 4 having a bell shaped structure and a stationary part 5.

Figure 2:
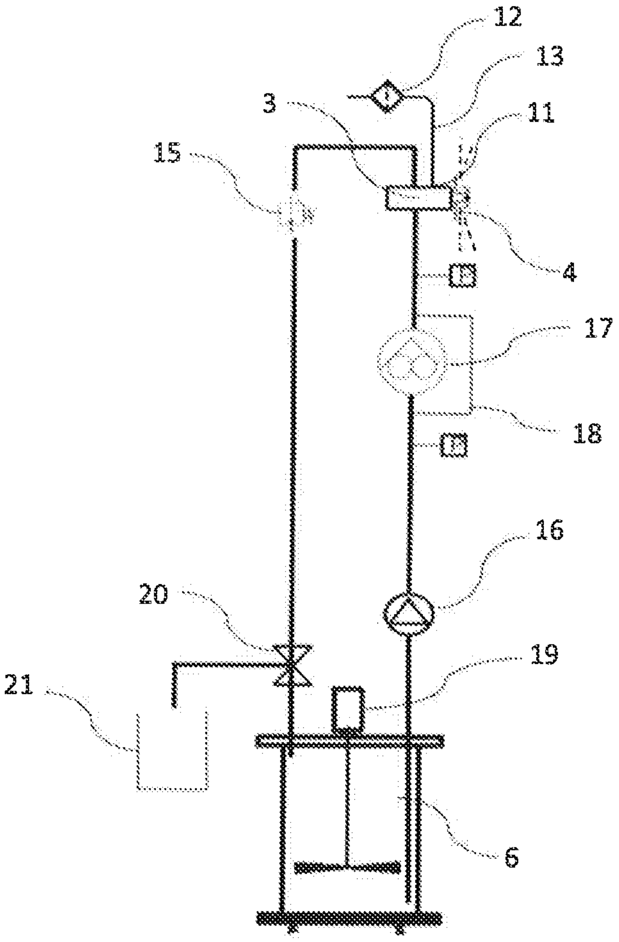

The dispersing head 3 being connected to a paint reservoir 6 through a conduit allowing a flow of paint from the paint reservoir 6 towards the dispersing head 3, as illustrated in FIG. 2.

Preferably but not limiting thereto, a flow of paint in the opposite direction, from the dispersing head 3 towards the paint reservoir 6 is not allowed, e.g. by mounting a non-return valve or similar on the conduit.

The dispersing head 3 preferably comprises a bell shaped structure connected to the rotating part 4 through a rotary shaft and a stationary part 5 provided in the center of the bell shaped structure.

The stationary part 5 comprising a small orifice or a nozzle, through which the paint is allowed to flow and reach the bell shaped structure.

By nozzle is should be understood a small opening, having a diameter selected between for example 0.3 millimeters and 1.5 millimeters. The diameter being typically selected in accordance with the properties of the paint and the thickness of the paint layer desired to be obtained after the surface has been painted.

For painting the inside surface of the compressor or vacuum pump housing 2, the nozzle is typically selected as having a diameter of: 0.5, 0.8, 1, or 1.2 millimeters.

Other values for the diameter of the nozzle should however not be excluded and the values included above should be seen only as examples.

The device 1 further comprising a controller 7 for controlling the rotational speed of the rotating part 4.

Because the controller 7 is controlling the rotational speed of the rotating part 4, the diameter of the droplets and therefore the thickness of the resulting layer of paint are controlled.

The controller 7 should be understood as a component part of the device 1 capable to receive data, perform analysis and calculations and send data to different components part of the device 1. It should not be excluded that the controller 7 can also send data remotely to an external controller or computer, not part of the device 1.

By data it should be understood measurements performed onto to the device or onto the compressor or vacuum pump housing or analysis or calculations performed by the controller 7, as will be further explained.

Accordingly, the controller 7 comprises a communication module (not shown) for receiving and transmitting data, a processing module (not shown) for performing analysis and calculations and a memory module for storing data such as received data, the performed analysis and calculations, etc.

For achieving a good control over the spaying mechanism, the device 1 further comprises a supporting structure 8 comprising fixing means (not shown). Such supporting structure 8 receiving the compressor or vacuum pump housing 2 and possibly allowing for the compressor or vacuum pump housing to be fixed thereon.

By adopting such a layout, the device 1 can control the flow of paint and the orientation of the dispersing head 3 in accordance with the shape and orientation of the compressor or vacuum pump housing 2.

The positioning of the compressor or vacuum pump housing 2 being done in a predetermined manner or said supporting structure 8 further comprising sensors sending information regarding the position and orientation of the compressor or vacuum pump housing 2 to the controller 7.

The controller 7 being provided with means for controlling the rotational direction of the rotating part 4 in a clockwise direction or in a counterclockwise direction depending on which one of the two semi-cylindrical structures of the compressor or vacuum pump housing 2 is being painted.

Preferably, but not limiting thereto, said means for controlling the rotational direction generating an electrical signal on a first communication line 9 between the controller 7 and the dispersing head 3, said electrical signal changing the rotational direction of the rotating part 4.

It should not be excluded that said first communication line allows for a bidirectional communication between the controller 7 and the dispersing head 3.

Said first communication line 9 being either a wired or a wireless communication line. In case of a wired communication line, an electrical conductor is provided, said electrical conductor being provided with two adaptors at each end and allowing for an electrical signal to be transmitted thereon.

In case of a wireless communication line, the controller 7 and the dispersing head 3 would comprise a transmitter and/or a receiver allowing for the communication to take place, or each of the two components can comprise a transceiver, allowing for a bidirectional communication between the two components.

Accordingly, the dispersing head 3 can send one or more of, for example: the current functioning characteristics, any possible measured values such as: the pressure value and/or the temperature and/or the viscosity of the paint entering the dispersing head 3, the pressure and/or the temperature and/or the viscosity of the paint reaching the stationary part 5, the volumetric flow rate of the paint flowing through the dispersing head 3, possibly the position of the dispersing head 3 with respect to the compressor or vacuum pump housing 2, and/or other parameters relating to the device 1 or the compressor or vacuum pump housing 2.

By the current functioning characteristics can be understood any one or more of the following: the current state of the dispersing head 3 such as for example if the dispersing head 3 is in use or not, or if it is in stand-by, if it is in use: the rotational direction of the rotating part 4, the speed of rotation, etc.

The controller 7 being capable to control the orientation of the dispersing head 3 with respect to the compressor or vacuum pump housing 2.

Preferably, but not limiting thereto, the controller 7 is positioning the dispersing head 3 with its central axis X-X' parallel to the longitudinal axis A-A' of the compressor or vacuum pump housing 2, as illustrated in FIG. 1.

In another embodiment according to the present invention, and not limiting thereto, the dispersing head 3 is positioned centrally in each of the two semi-cylindrical structures and is moved vertically and parallel with the axis X-X'. It should however not be excluded that the dispersing head 3 can also be positioned closer to a lateral wall of a respective semi-cylindrical structure or further away from said lateral wall.

In an embodiment according to the present invention and not limiting thereto, the dispersing head 3 can comprise one or more sensors determining the exact positioning and orientation of said dispersing head 3 with respect to the compressor or vacuum pump housing 2 such as: the distance from the supporting structure 8, the positioning with respect to the center of the compressor or vacuum pump housing 2, and possibly the distance from every wall of the compressor or vacuum pump housing 2. The dispersing head 3 sending such data to the controller 7.

It should not be excluded that an operator is controlling the position of the dispersing head 3 based on his visual interpretation of the painting process.

It is further possible that such an operator can adjust the rotational speed of the rotating part 4 manually.

In yet another embodiment according to the present invention, the dispersing head 3 can comprise one or more sensors for allowing the controller 7 to generate a three dimensional representation of the walls of the compressor or vacuum pump housing 2, for a more accurate and automated painting process.

Because the dispersing head 3 comprises a rotating part 4 comprising a bell shaped structure, the paint flowing from the stationary part 5 is reaching the bell shaped structure and slides onto said bell shaped structure towards its edge. Further, the paint droplets leave that edge in a tangential direction, under the influence of centrifugal force, most of the paint droplets reaching the surface of the housing.

Accordingly, the rotational direction of the bell shaped structure will influence the trajectory of the paint droplets.

Turning to the compressor or vacuum pump housing 2 and looking at such compressor or vacuum pump housing 2 positioned on the supporting structure 8, one way of positioning it would be with the gas inlet positioned further away from the surface of the supporting structure 8 such that with respect to a position of the gas inlet, the gas outlet is positioned closest to the surface of the supporting structure 8.

Figure 3:
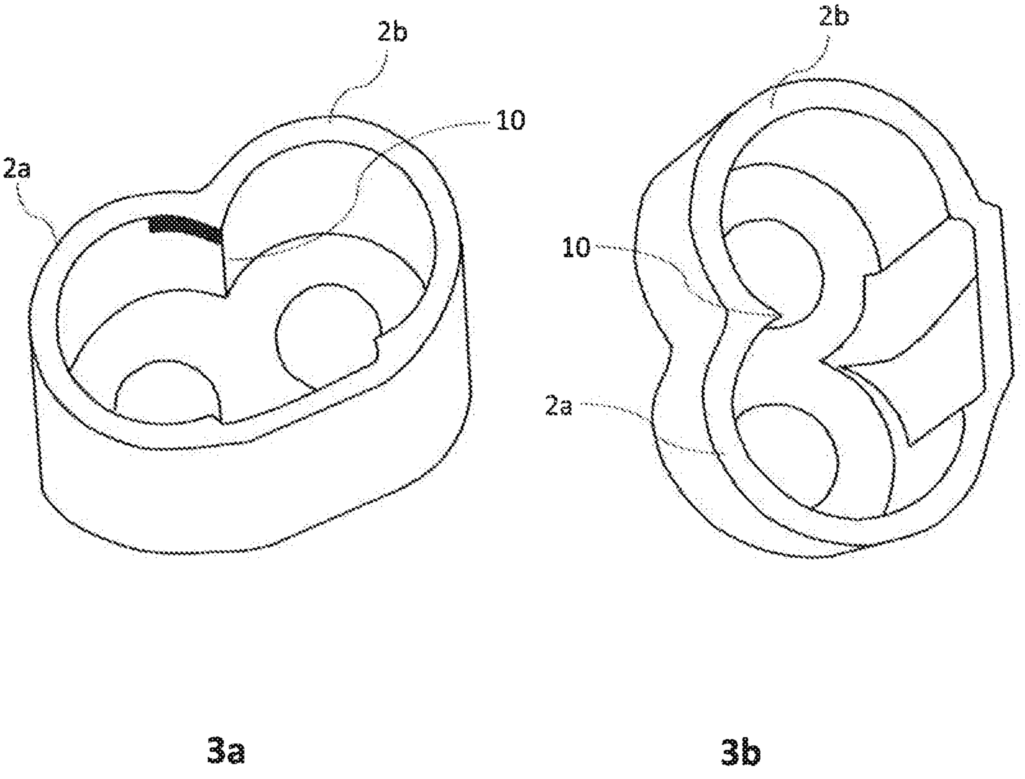
FIG. 3 schematically illustrates two top rotated views of a compressor or vacuum pump housing that can be painted with a device according to the present invention.

The compressor or vacuum pump housing 2 comprising two interconnected semi-cylindrical structures: a left semi-cylinder 2*a* connected to a right semi-cylinder 2*b*, as shown in FIG. 3. By interconnecting the two semi-cylindrical structures, an inflection surface 10 is created on the entire height of the compressor or vacuum pump housing 2 because of the shape of such semi-cylindrical structures.

Existing devices used for painting such compressor or vacuum pump housings would adopt one direction of rotation for the rotating part 4 from the start to the finish of the painting process. They adopt, for example a clockwise rotational direction, therefore a movement starting from the left hand side towards the right hand side and continuously rotating around its central axis X-X', whenever the process of painting is active.

If we would apply such a process for the paining of the right semi-cylinder 2*b* as well as the left semi-cylinder 2*a*, the phenomenon of overpainting would be encountered at the level of one of the two semi-cylinders onto the surface found immediately following the inflection surface, as shown in FIG. 3*a* with a hard line on the left semi-cylinder 2*a*.

For example, if a clockwise rotational direction is chosen for painting a compressor or vacuum pump housing 2 placed with the gas inlet positioned further away from the surface of the supporting structure 8 such that with respect to a position of the gas inlet, the gas outlet is positioned closest to the surface of the supporting structure 8, and looking from above at the compressor or vacuum pump housing 2, the phenomenon of overpainting would be encountered at the level of the left semi-cylinder 2*a*, on the surface immediately following the inflection surface, as illustrated in FIG. 3*a*.

Whereas, if a counterclockwise direction would be chosen, the phenomenon of overpainting would be encountered at the level of the right semi-cylinder 2*b*, on the surface immediately following the inflection surface, not shown.

In an embodiment according to the present invention, but not limiting thereto, said supporting structure 8 can be in the shape of a table, or simply interconnected metal bars allowing access to the compressor or vacuum pump housing 2 from all directions, or the compressor or vacuum pump housing 2 can be sustained by a set of chains.

In case the supporting structure 8 is in the shape of a table or interconnected metal bars, the supporting structure 8 is adapted to be positioned on the floor, in the chamber where the painting process takes place.

In another embodiment according to the present invention, but not limiting thereto, the device 1 further comprises a source of vacuum (not shown) positioned above or under the level of the housing and preferably centered onto said housing, for extracting excess droplets of paint.

Preferably, but not limiting thereto, the dispersing head 3 comprises an air receiving port 11 allowing a flow of air to reach the flow of paint and helping in achieving the desired density and diameter of the paint droplets leaving the bell shaped structure.

Preferably, but not limiting thereto, the flow of air is compressed air generated by a compressor or vacuum pump 12 or a source of compressed air.

Said compressor or vacuum pump 12 or source of compressed air being connected to the receiving port 11 through an air conduit or pipe 13.

In an embodiment according to the present invention, the device 1 further comprises a mobile arm 14 onto which the dispersing head 3 is mounted.

Preferably, but not limiting thereto, the controller 7 is adapted to move the mobile arm 14 on a vertical axis and a horizontal axis.

By including the mobile arm 14, the movement of the dispersing head 3 on the horizontal and vertical axis is assured, the painting process can be fully automatized and the entire inside surface of the compressor or vacuum pump housing 2 can be painted.

Said mobile arm 14 can be a robotic arm comprising at least a joint allowing movement on the horizontal and vertical axis and possibly allowing a rotational movement around its axis.

In another embodiment according to the present invention, for achieving the best result, based on the position of the dispersing head 3 with respect to the left semi-cylindrical and the right semi-cylindrical structures, 2*a* and 2*b*, the controller 7 is adapted to change the direction of rotation of the rotating part 4 automatically.

Further, for a better regulation of the volume of paint and therefore for achieving a more accurate thickness and uniform layer of paint, the device 1 can further comprise a feeding system comprising regulating means adapted to regulate the volumetric flow rate of the paint reaching the dispersing head 3.

Said regulating means being selected from a group comprising: a pump, a compressor, a flow meter, etc.

It should not be excluded that the controller 7 can regulate the volumetric flow rate of paint through an algorithm.

Such algorithm coordinating the volumetric flow rate of the paint with the rotational speed of the rotating part 4 and with the thickness of the layer of paint desired to be obtained on the inside surface of the compressor or vacuum pump housing 2.

The controller 7 possibly further correlating these parameters with one or more of the following: the pressure value in the pipes or conduits part of the device 1, the diameters of such conduits or tubes through which paint is flowing, the characteristics of the paint, such as viscosity and temperature, the diameter of the nozzle part of the stationary part 5, or the shape and/or diameter of the rotating part.

In another embodiment according to the present invention, the volumetric flow rate can be manually controlled by an operator.

In a preferred embodiment according to the present invention, but not limiting thereto, the device 1 further comprises a paint pump 16 mounted on the conduit connecting the paint reservoir 6 and the dispersing head 3.

Preferably, but not limiting thereto, for increasing the volume of paint extracted from the paint reservoir 6, the paint pump 16 can be a membrane pump.

For accurately controlling the flow rate of the paint reaching the dispersing head 3, the device 1 can further comprise a second paint pump 17 positioned downstream of the paint pump 16 and upstream of the dispersing head 3.

Preferably, but not limiting thereto, said second paint pump is selected as a gear pump. By including such a gear pump, the flow of paint can be even more accurately controlled irrespective of the viscosity and temperature of the paint.

Accordingly, the controller 7 can comprise means for regulating the pressure of the paint pump 16 and can further regulate the rotational speed of the second paint pump 17. In such a situation, the paint pump 16 and/or the second paint pump 17 can comprise communication lines to the controller 7, not shown.

In another embodiment according to the present invention, the controller 7 can correlate the different parameters such as the volumetric flow rate, the pressure value at the level of the paint reservoir 6 or at the level of the pressure vessel with the thickness of the resulting layer of paint and with one or more of the following: the pressure value at the level of the membrane pump, the rotational speed of the bell shaped structure, the speed of the gear pump, the distance between the bell shaped structure and the inside surface of the compressor or vacuum pump housing 2, the diameter of the nozzle, the diameter of the pipe or conduit between the paint reservoir 6 or pressure vessel and the dispersing head 3, the temperature and viscosity of the paint.

In yet another embodiment according to the present invention and not limiting thereto, the device can further comprise means for covering at least one part of the inside surface of the compressor or vacuum pump housing 2. Such means being in the shape of for example, a removable accessory or mask manipulated automatically or manually and offering additional protection for eliminating the risk of over-painting parts of the inside surface.

In another embodiment according to the present invention, the device 1 can comprise a pressure vessel, not shown, case in which the device 1 comprises one or more pressure sensors at the level of the dispersing head 3.

Based on the pressure measurements, the controller 7 can further influence the pressure value of the paint at the level of the pressure vessel.

The adjustment being possible through, for example, an air tube comprising a pressure regulator that is provided above the level of the paint, within said pressure vessel. By adjusting the flow of air through that tube, the pressure of the paint within the pressure vessel can be adjusted.

In another embodiment according to the present invention, such an air tube and pressure regulator can be provided within vessel 6. Such a layout allowing for a more accurate control of the flow of paint and, consequently, a more accurate control of the thickness of the resulting layer of paint on the inside surface of the compressor or vacuum pump housing 2.

In another embodiment according to the present invention, for determining the pressure of the paint through the piping system of the device 1, said device 1 can comprise one or more pressure sensors, positioned in one or more locations, selected from a group comprising: between the paint reservoir 6 and the paint pump 16, between the paint pump 16 and the second paint pump 17, between the second paint pump 17 and the dispersing head 3, at the paint inlet at the level of the dispersing head 3, on the paint channel before the paint reaches the rotating part 4 at the level of the dispersing head 3, etc.

The method for painting a compressor or vacuum pump housing 2 comprising a first semi-cylindrical structure adjoined to a second semi-cylindrical structure, according to the present invention is very simple and as follows.

The compressor or vacuum pump housing 2 is being fixed to the supporting structure 8 and the device 1 according to the present invention is being used for painting the inside surface of the compressor or vacuum pump housing 2.

Accordingly, the controller 7 is controlling the rotational direction of the rotating part 4 in clockwise direction while painting a first semi-cylindrical structure of the compressor or vacuum pump housing 2 and is changing the rotational direction to a counterclockwise direction while painting a second semi-cylindrical structure of the compressor or vacuum pump housing 2.

Preferably, but not limiting thereto, the controller 7 is controlling the rotational direction of the rotating part 4 automatically.

In one embodiment according to the present invention, once the controller 7 detects a different position of the dispersing head 3 on the horizontal direction that would indicate that the dispersing head 3 had finished painting first semi-cylindrical structure, the controller 7 generates an electrical signal towards the dispersing head 3, changing the rotational direction of the bell shaped structure.

In another embodiment according to the present invention, once the controller 7 detects that the dispersing head finished painting the first semi-cylindrical structure, it will generate an electrical signal to stop the flow of paint until the dispersing head 3 is brought into position to paint the second semi-cylindrical structure. Additionally, the controller 7 generates an electrical signal to change the rotational direction of the bell shaped structure and once the dispersing head 3 is in position, the controller 7 will generate an electrical signal, starting the flow of paint and allowing for the paint to be dispersed onto the second semi-cylindrical structure.

In another embodiment according to the present invention, an operator can visually detect when the dispersing head 3 had finished painting the first semi-cylindrical structure and can push an actuator sending a signal to the controller 7 for changing the rotational direction of the bell shaped structure.

In another embodiment according to the present invention, for an increased automation of the painting process, the dispersing head 3 is mounted on a mobile arm 14.

Further preferably, but not limiting thereto, the controller 7 is controlling the mobile arm 14 to move on a vertical axis, A-A', and a horizontal axis, B-B'.

In another embodiment according to the present invention, the controller 7 is regulating the volumetric flow rate of the paint reaching the dispersing head 3.

Preferably, but not limiting thereto, the controller 7 is positioning the dispersing head 3 downwards, facing the supporting structure 8 or, in other words, oriented towards the ground.

In another embodiment according to the present invention and not limiting thereto, the controller 7 is moving the dispersing head 3 along the longitudinal axis of the compressor or vacuum pump housing 2, A-A', from one end to the other.

In yet another embodiment according to the present invention, for maintaining a homogenous paint mixture and for avoiding depositions on the bottom of the paint reservoir 6, the device 1 is mixing the paint. For achieving this, the device 1 can use a pneumatic stirrer 19.

Preferably, but not limiting thereto, the mixing of the paint is done continuously.

Said pneumatic stirrer 19 can be controlled by the controller 7, it can be remotely controlled through an external computer, or it can be controlled manually by an operator.

Further, for avoiding depositions on the piping system of the device 1 when the painting process is not active, the controller 7 can activate the valve 15, allowing the paint to continuously run through the device 1.

In this perspective, the flow of paint is guided such that it is bypassing the dispersing head 3 and is continuing to flow through a piping system reaching the paint reservoir 6.

The controller 7 can control the volumetric flow rate of the paint through the speed of the paint pump 16 and through the speed of the second paint pump 17.

If the flow rate of the paint is sufficient by simply controlling the paint pump 16, the controller 7 can stop the second paint pump 17, and the flow of paint is directed through a bypass pipe 18 to reach the dispersing head 3.

For cleaning the piping system of the device 1, the controller actuates the outlet valve 20 and the flow of paint is guided outside the device 1, flowing into a bucket or reservoir 21.

When the painting process is not active or during the cleaning process, the second paint pump 17 can be stopped, and the flow of paint directed through the bypass pipe 18.

Preferably, for avoiding depositions at the level of the second paint pump 17, such second paint pump 17 can be periodically switched on.

By 'periodically' it should be understood after a selected time interval, like for example and not limiting thereto: every 5 minutes, every 10 minutes, every 15 minutes, every 20 minutes, every half of hour, or another time interval.

Depending on the design of the device 1, the device 1 can comprise some or even all the technical features presented herein, in any combination without departing from the scope of the invention.

By 'technical features' it is meant at least: the supporting structure 8 comprising fixing means, the control of the flow of paint, the control of the orientation of the dispersing head 3, the inclusion of sensors for determining the position and orientation of the compressor or vacuum pump housing 2, the inclusion of the first communication line 9, either wired or wireless, the control of the orientation of the dispersing head 3 with respect to the compressor or vacuum pump housing 2, the inclusion of one or more sensors for determining the position and orientation of the dispersing head 3, manual or automatic control of the position of the dispersing head 3, and/or of the rotational speed of the rotating part 4, and/or of the volumetric flow rate of the paint, the inclusion of a source of vacuum, the air receiving port 11, the compressor or vacuum pump 12, the air conduit or pipe 13, the mobile arm 14, changing the rotational direction of the rotating part 4 automatically, the feeding system comprising regulating means, the paint pump 16, the second paint pump 17, communication lines to the paint pump 16 and/or to the second paint pump 17, the controller 7 can control the pressure of the paint in the paint reservoir 6 or pressure vessel, automatic or manual changing of the rotational direction of the bell shaped structure, the controller 7 can correlate the thickness of the resulting layer of paint with different parameters, the inclusion of the pneumatic stirrer 19, the inclusion of the valve 15, the inclusion of the bypass pipe 18, the inclusion of the bucket or reservoir 21, periodically switching on and off the second paint pump 17, the inclusion of the outlet valve 20.

The present invention is by no means limited to the embodiments described as an example and shown in the drawings, but such a device 1 can be realized in all kinds of variants, without departing from the scope of the invention.

The invention claimed is:

1. A device for painting a compressor or vacuum pump housing, comprising:

a dispersing head for dispersing paint droplets to a non-cylindrical interior surface of the compressor or vacuum pump housing, the dispersing head comprising a rotating part having a bell shaped structure and a stationary part, wherein the compressor or vacuum pump housing includes a first semi-cylindrical structure and a second semi-cylindrical structure that only partially intersects the first semi-cylindrical structure to form said non-cylindrical interior surface, and wherein the rotating part is configured to disperse said paint droplets to the non-cylindrical interior surface of the compressor or vacuum pump housing while the rotating part alternately rotates in a first rotational direction and in a second rotational direction;

a paint reservoir connected to the stationary part through a conduit;

a supporting structure comprising fixing means adapted to receive the compressor or vacuum pump housing in a fixed manner;

wherein the device further comprises a controller for controlling a rotational speed of the rotating part, and wherein the controller includes means for controlling a rotational direction of the rotating part by causing the rotating part to rotate in a clockwise direction while the dispersing head disperses said paint droplets to the first semi-cylindrical structure of the compressor or vacuum pump housing, and by changing the rotational direction of the rotating part to a counterclockwise direction after dispersing said paint droplets to the first semi-cylindrical structure and before dispersing said paint droplets to the second semi-cylindrical structure, such that the dispersing head disperses said paint droplets to the first semi-cylindrical structure while rotating in the clockwise direction and to the second semi-cylindrical structure while rotating in the counterclockwise direction.

2. The device according to claim 1, wherein the device further comprises a mobile arm configured to receive the dispersing head thereonto.

3. The device according to claim 2, wherein the controller is adapted to move the mobile arm on a vertical axis and a horizontal axis.

4. The device according to claim 1, wherein the controller is adapted to change the direction of rotation of the rotating part automatically.

5. The device according to claim 1, wherein the device further comprises a feeding system comprising regulating means adapted to regulate the volumetric flow rate of the paint reaching the dispersing head.

6. The device according to claim 5, wherein said regulating means is selected from a group comprising: a pump, a compressor, or a flow meter.

7. The device according to claim 1, wherein the dispersing head comprises an air receiving port.

8. The device according to claim 1, wherein the device comprises a paint pump.

9. The device according to claim 8, wherein the device comprises a second paint pump, preferably a gear pump, configured to be positioned downstream of the paint pump and upstream of the dispersing head.

10. The device according to claim 9, wherein the device comprises a bypass pipe configured to bypass the second paint pump.

11. The device according to claim 9, wherein the controller comprises means for regulating the pressure value at the level of the paint pump and/or a rotational speed of the second paint pump.

12. The device according to claim 1, wherein the device comprises a pressure vessel and one or more pressure sensors at the level of the dispersing head.

13. The device according to claim 1, wherein the paint reservoir comprises a pneumatic stirrer.

14. The device according to claim 1, wherein the device comprises a valve configured to be activated by a controller and to allow paint to continuously run through the device.

* * * * *